Patented Apr. 22, 1941

2,239,617

UNITED STATES PATENT OFFICE 2,239,617

PREPARATION OF IMINODIACETIC AND AMINOTRIACETIC ACIDS

John C. Moore, Midland, Mich., assignor to The Dow Chemical Company, Midland, Mich., a corporation of Michigan No Drawing. Application April 29, 1939, Serial No. 270,911

2 Claims. (Cl. 260—534)

This invention concerns an improved method for the preparation of iminodiacetic and aminotriacetic acids, and in particular relates to a method for the recovery and separation of these acids from aqueous solutions of their neutral ammonium salts, such as are obtained as by-products in the manufacture of glycine.

In the preparation of glycine by the ammonlysis of monochloracetic acid or other monohaloacetic acid, the by-products iminodiacetic acid $(NH(CH_2COOH)_2)$ and aminotriacetic acid $(N(CH_2COOH)_3)$ are obtained as a consequence of over-reaction of the monohaloacetic acid with the ammonia. The reactions which take place during such process may be represented by the following equations:

(1) $ClCH_2COOH + 2NH_3 \rightarrow$
$NH_4Cl + NH_2CH_2COOH$ (glycine)
(2) $2ClCH_2COOH + 3NH_3 \rightarrow$
$2NH_4Cl + NH(CH_2COOH)_2$ (iminodiacetic acid)
(3) $3ClCH_2COOH + 4NH_3 \rightarrow$
$3NH_4Cl + N(CH_2COOH)_3$ (aminotriacetic acid)

Since an excess of ammonia is usually present in the reaction, the iminodiacetic and aminotriacetic acids are obtained in the form of their neutral ammonium salts rather than as free acids. Accordingly, the reaction product obtained in the commercial manufacture of glycine by reacting monochloracetic acid with ammonia according to Equation 1 consists essentially of an aqueous solution of glycine, ammonium chloride, and ammonia, together with smaller amounts of the ammonium salts of the iminodiacetic and aminotriacetic acids which have been formed by reaction according to Equations 2 and 3. This solution is concentrated and is then diluted with methanol to precipitate the glycine and part of the ammonium chloride. The crude glycine precipitate is filtered off and is purified by recrystallization, and the filtrate is neutralized and distilled to recover the methanol. The still residue, which comprises a concentrated solution of ammonium chloride and the neutral ammonium salts of iminodiacetic and aminotriacetic acids, has heretofore been discarded since there was no method known whereby the valuable products contained therein could be conveniently and economically recovered and separated.

I have now found that iminodiacetic acid and aminotriacetic acid are insoluble in dilute acid solutions having a pH value approximately corresponding to the isoelectric point of these acids, i. e. a pH value between about 1 and about 3.5, and, accordingly, that these acids may be recovered from aqueous solutions of their ammonium salts by acidifying such solutions to a pH value between about 1 and about 3.5, and thereafter filtering the precipitated acids from the solution and separating them by fractional crystallization from water.

In preparing iminodiacetic and aminotriacetic acids according to the invention, a monohaloacetic acid, e. g. chloracetic acid, bromacetic acid, or iodoacetic acid, is heated with aqueous ammonia according to the procedure customarily employed in the manufacture of glycine, whereby there is obtained an aqueous solution essentially comprising glycine, an ammonium halide, ammonia, and iminodiacetic and aminotriacetic acids in the form of their ammonium salts. The relative amounts of the various aminated acids obtained depends largely upon the proportions in which the haloacetic acid and ammonia are reacted, and in general it may be stated that the yield of iminodiacetic and aminotriacetic acids is increased at the expense of the yield of glycine by increasing the ratio of haloacetic acid to ammonia. Hence, if it is desired to form glycine as the major product of the reaction, it is preferable to employ a large molecular excess of ammonia; e. g. from 10 to 60 moles of ammonia per mole of haloacetic acid, whereas when it is desired to form a larger proportion of iminodiacetic acid and aminotriacetic acids, a somewhat smaller proportion of ammonia is employed.

Regardless of the relative amounts of glycine, iminodiacetic acid, and aminotriacetic acid present in the solution, however, the latter is boiled, at first under atmospheric pressure and then under reduced pressure, to drive off the free ammonia, and is then treated with an approximately equal volume of methanol to precipitate the glycine and a portion of the ammonium halide. The precipitate is filtered off and washed and, if desired, the glycine is purified by re-precipitation from a methanol-water solution. The original methanol-containing filtrate is then carefully acidified, preferably with a strong mineral acid such as hydrochloric or sulphuric acid, until the solution has a pH value between about 1 and about 3.5, at which hydrogen ion concentration iminodiacetic acid and aminotriacetic acid exist in the free state and do not tend to form acid or basic salts.

A convenient method of carrying out the acidification consists in adding the acid in small increments until the desired acidity of pH=1 to 3.5 is attained as shown by the color change of an indicator such as Congo red or Thymol blue. Upon standing for several hours, a mixture of iminodiacetic acid and aminotriacetic acids and a small amount of ammonium halide precipitates from the acidified solution. The precipitate is filtered off, washed, and stirred with approximately 3 to 6 parts by weight of water, preferably at a temperature of approximately 50° to 60° C., whereby the iminodiacetic acid goes into solution and the aminotriacetic acid remains undissolved. The latter compound may then be filtered off and the filtrate cooled to crystallize the iminodiacetic acid.

The following example illustrates one way in which the principle of the invention has been applied but is not to be construed as limiting the same:

Example

Monochloracetic acid was reacted with 18 equivalents of aqueous ammonia at a temperature of 20° to 25° C. for 16 hours after which time the reaction mixture was evaporated until ammonium chloride began to crystallize from solution. The ammonia which was driven off during the evaporation was recovered by absorption in cold water. The concentrated mother liquor was then treated with an equal volume of methanol and the crude glycine which was precipitated thereby was filtered off, washed, and purified by re-precipitation. The alcoholic filtrate was then processed for the recovery of iminodiacetic and aminotriacetic acids as follows: 41 pounds of the filtrate was treated with concentrated hydrochloric acid until it was just acid to Congo red, 3.12 pounds of the acid being required. The acidified solution was allowed to stand for 24 hours with occasional stirring whereby there was precipitated a mixture of iminodiacetic acid, aminotriacetic acid, and ammonium chloride. This mixture was filtered from the solution and dried. The dry product weighed 3.63 pounds. 2.97 pounds of the dry material was then stirred for several minutes with 5.4 liters of water at a temperature of about 55° C. in order to dissolve the iminodiacetic acid. The undissolved aminotriacetic acid was filtered off and recrystallized from 12 liters of water, whereby there was obtained 0.5 pound of purified aminotriacetic acid. The solution of iminodiacetic acid was allowed to cool with occasional stirring to promote crystallization, and after several hours standing at room temperature 0.88 pound of iminodiacetic acid crystallized from solution. A second crop of crystals weighing 0.68 pound was obtained by evaporation of the mother liquor. Recrystallization of the first crop from 1.9 liters of water yielded 0.65 pound of purified iminodiacetic acid.

Other modes of applying the principle of my invention may be employed instead of those explained, change being made as regards the process herein disclosed, provided the step or steps stated by any of the following claims or the equivalent of such stated step or steps be employed.

I therefore particularly point out and distinctly claim as my invention:

1. In a method for the preparation of iminodiacetic acid and aminotriacetic acid, the steps which consist in reacting a monohaloacetic acid with aqueous ammonia, removing glycine from the reaction product by precipitation with methanol followed by separation of the precipitated glycine from the methanol-containing solution, precipitating a mixture of iminodiacetic acid and aminotriacetic acids from said solution by treating the same with an acid to form a solution having a pH value between about 1 and about 3.5, separating the precipitated acids from the acidified solution, and separating said acids from each other by fractional crystallization from water.

2. In a method for the preparation of iminodiacetic acid and aminotriacetic acid, the steps which consist in reacting monochloracetic acid with aqueous ammonia, removing glycine from the reaction product by precipitation with methanol followed by separation of the precipitated glycine from the methanol-containing solution, precipitating a mixture of iminodiacetic acid and aminotriacetic acid from said solution by treating the same with concentrated hydrochloric acid to form a solution having a pH value between about 1 and about 3.5, separating the precipitated acids from the acidified solution, and separating said acids from each other by fractional crystallization from water at a temperature between about 50° and about 60° C.

JOHN C. MOORE.